United States Patent [19]

Puzio et al.

[11] Patent Number: 4,842,118
[45] Date of Patent: Jun. 27, 1989

[54] CLUTCH

[75] Inventors: Daniel Puzio, Boonton, N.J.; William H. Georges, Saginaw, Mich.; Gary L. Bevilacqua, York, Pa.

[73] Assignee: General Motors Corporation, Detroit, Mich.

[21] Appl. No.: 158,221

[22] Filed: Feb. 19, 1988

[51] Int. Cl.[4] ............................................. B25J 9/00
[52] U.S. Cl. ................................. 192/150; 901/46; 901/49
[58] Field of Search .................... 192/150; 901/46, 49

[56] References Cited

U.S. PATENT DOCUMENTS

| | | | |
|---|---|---|---|
| 3,050,598 | 8/1962 | Fennessy | 200/61.46 |
| 3,305,058 | 2/1967 | Orwin et al. | 192/56 R |
| 3,608,686 | 9/1971 | Martin et al. | 192/150 |
| 3,625,328 | 12/1971 | Carli | 192/142 R |
| 3,654,412 | 4/1972 | Haruna et al. | 200/832 |
| 4,209,185 | 6/1980 | St. Clair et al. | 280/734 |
| 4,424,961 | 1/1984 | Takei | 267/64.27 |
| 4,540,331 | 9/1985 | Stanner et al. | 414/730 |

FOREIGN PATENT DOCUMENTS 0088559 9/1983
2445199 7/1980 France .
0698905 11/1979 U.S.S.R. .

Primary Examiner—Leslie A. Braun
Assistant Examiner—Andrea Pitts
Attorney, Agent, or Firm—Ernest E. Helms

[57] ABSTRACT

The present invention provides an apparatus and method of utilization thereof of a clutch for placement between a robot or the like and an attached end of arm tooling device. A preferred embodiment of the inventive clutch provides compliance in six axes with adjustable setting and detection means to signal the robot or like to cease operation upon deformation of the clutch element.

11 Claims, 2 Drawing Sheets

CLUTCH

FIELD OF THE INVENTION

The field of the present invention is that of a clutch or overload device for connection between a robot or like and an attached end of arm tooling (EOAT) device. Robotic clutches are used to prevent excessive loading on the EOAT damaging the robot or like.

DISCLOSURE STATEMENT

Robotic clutches (also commonly referred to as cut-out devices) connect a robot or like with an attached EOAT. The clutch is provided to protect the robot and the attached EOAT from damage when excessive loading is placed on the EOAT due to malfunctioning of the robot or EOAT and/or foreign objects improperly positioned within the operating envelope of the robot which the EOAT may inadvertently make contact with. Additionally, many clutches are designed not only to deform to prevent damage to the EOAT and robot but are also designed to signal the robot to cease movement when deformation of the clutch element has occurred.

One of the problems which must be overcome when utilizing a clutch is that the clutch must be stiff enough to hold the EOAT under the working dynamic loads which are usually placed on the EOAT, yet the clutch must be compliant enough to deform upon occurrence of an excessive load upon the EOAT. An example of an above described device is shown and illustrated in Stanner et al, U.S. Pat. 4,540,331, commonly assigned. The present invention provides a robot clutch which is an alternative to that shown and illustrated in the Stanner et al patent.

It is an object of the present invention to provide an apparatus and method of utilization thereof of a clutch for attachment between a robot and the like and an attached EOAT.

It is an object of the present invention to provide a clutch adapted to be connected between an EOAT and a robot or like for deformation upon loading upon the EOAT beyond a predetermined amount, the clutch including a first plate for connection with the robot or like, a second plate spaced from the first plate for connection with the EOAT, a rod pivotally mounted with respect to one of the plates and mounted with the other plate, and means to angularly restrain the rod with respect to the plate the rod is pivotally mounted to whereby the second plate has a fixed position with respect to the first plate unless the EOAT is loaded beyond a predetermined amount causing the rod to pivot.

It is an object of the present invention to provide a clutch adapted to be connected between an EOAT and a robot or like for deformation upon loading of the EOAT beyond a predetermined amount, the clutch including a first plate for connection with the robot or like, a second plate spaced from the first plate for connection with the EOAT, means to detect a change of position of the second plate with respect to the first plate, a rod pivotally and rotatively mounted with respect to the first plate and relatively mounted with respect to the second plate in a linear fashion, adjustable means to angularly and rotatively restrain the rod with respect to the first plate, adjustable means to restrain linear movement of the second plate with respect to the rod whereby the second plate has a fixed position with respect to the first plate unless the EOAT is loaded beyond a predetermined amount causing the rod to pivot or rotate or the second plate to linearly move with respect to the rod.

It is an object of the present invention to provide a method for allowing deformation in the position of an EOAT connected with a robot or like with respect to the position of the robot or like due to loading upon the EOAT beyond a predetermined amount, the method including mounting with the robot or like a first plate, mounting with the EOAT a second plate spaced from the first plate, pivotally connecting with the first or second plate a rod mounted with the other plate, angularly restraining the position of the rod with respect to the plate the rod is pivotally connected to whereby the second plate has a fixed position with respect to the first plate unless the EOAT is loaded beyond a predetermined amount causing the rod to pivot.

Other objects of the present invention will become more apparent to those skilled in the art as the nature of the invention is better understood from the accompanying drawings and a detailed description.

DETAILED DESCRIPTION OF THE DRAWINGS

Figure 1:
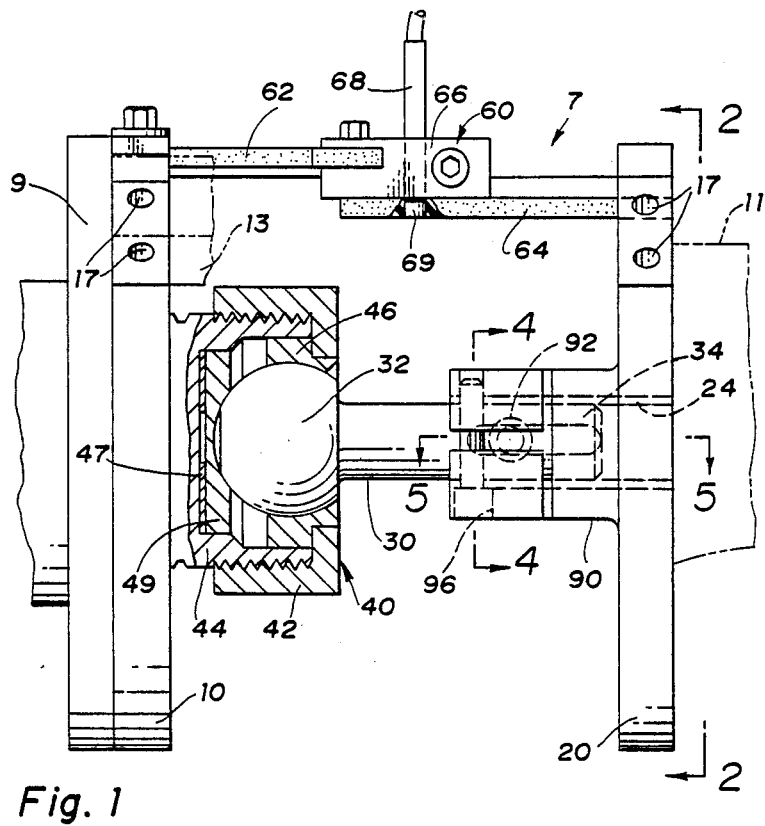
FIG. 1 is a sectional view partially in front elevation of a preferred embodiment clutch of the present invention.
Figure 2:
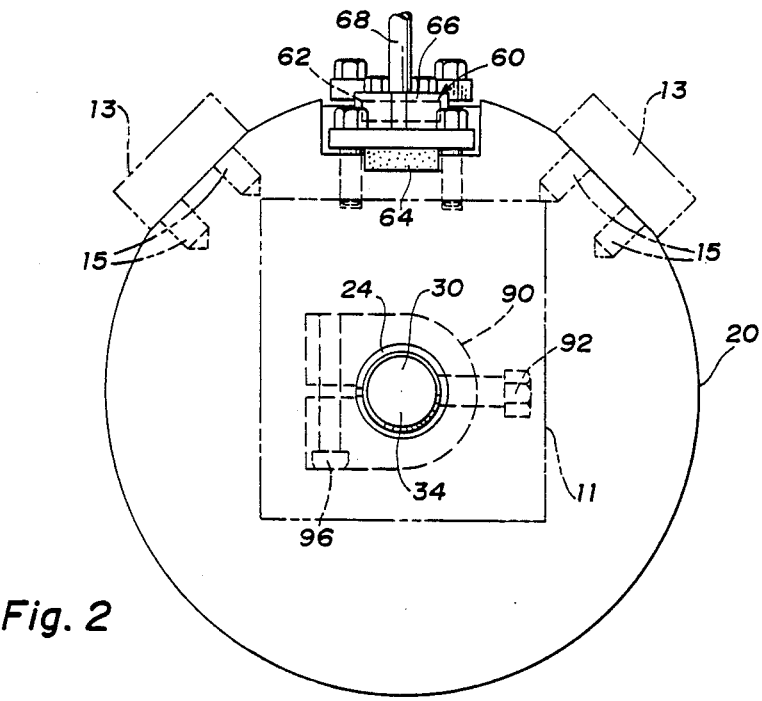
FIGS. 2, 4 and 5 are views taken along lines 2—2, 4—4, 5—5 of FIG. 1 respectively.

Referring to FIGS. 1 and 2, the robot crash detector or clutch 7 is connected between the end of the robot arm 9 and the EOAT 11. First plate 10 is connected to the robot 9 and a second plate 20 is connected to the EOAT 11. The mounting surfaces on the first and second plates 10 and 20 are so designed to accommodate varied hole configurations which increase the adaptability of clutch 7.

A rod 30 with a ball end 32 is pivotally and rotatively mounted with respect to first plate 10. The other end 34 of rod 30 is mounted to have relative linear movement with second plate 20.

Means are provided to angularly and rotationally restrain the rod 30 with respect to the first plate 10. Restraining means 40 includes a ball seat 46 mounted in a cylinder 44.

To properly position the rod 30 the clutch 7 is placed in an alignment jig, or two alignment bars 13 with projecting dowel pins 15 are mated into holes 17 of the first 10 and second plates 20. The above assures the proper angular position of rod 30 in restraining means 40 and to assures the correct linear position of rod end 34 in plate 20.

A nut 42 is tightened over the ball seat 46 thus providing an angular and rotational stiffness to the rod 30 with respect to first plate 10 that is proportional to the torque applied to the nut 42. Bellville spring washer 47 preloads spring seat 49 and ball seat 46. Adjustment of the angular restraining force can be effected by adjustment in the torque of nut 42.

Figure 3:
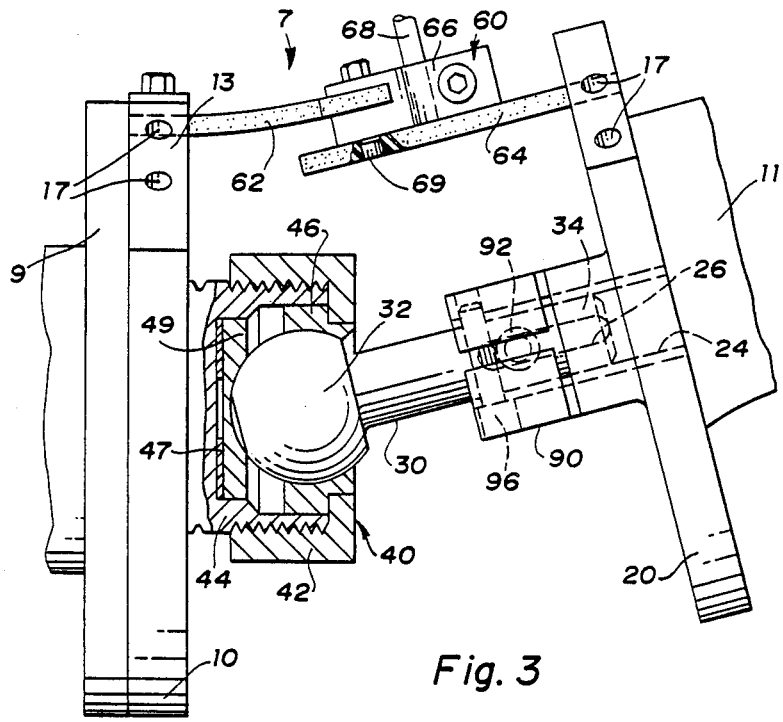
FIG. 3 is a view substantially similar to that of FIG. 1 illustrating the clutch of the present invention under deformation by excessive loading on an EOAT.
Figure 4:
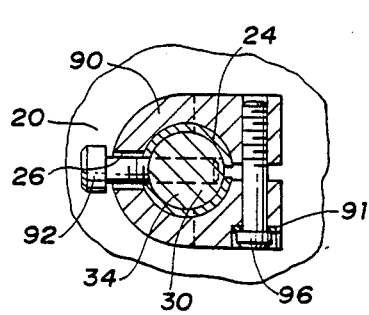
Figure 5:
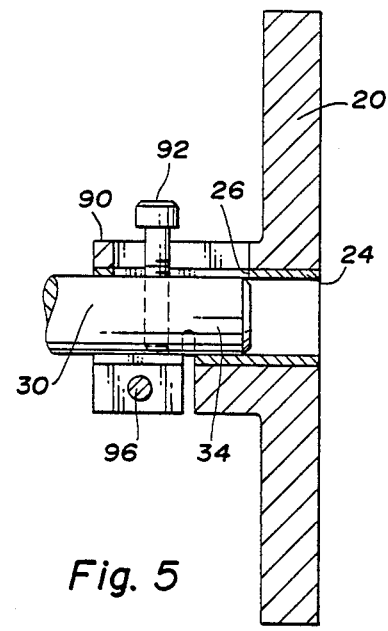

Referring additionally to FIGS. 3, 4 and 5 second plate 20 has a female portion 90 to receive the rod 30.

Interposed between female portion 90 and rod 30 is a sleeve 24. Both female portion 90 and sleeve 24 have an elongated slot 26 aligned with one another. Slots 26 are penetrated by bolt 92 which is threaded into rod 30.

Rod 30 is clasped by the female portion 90 when tightened by bolt 96. Spring washers 91 are added to help provide fine adjustment in the clamping force. Bolt 96 in cooperation with female portion 90 restrains movement in a linear fashion of second plate 20 with respect to first plate 10. Adjustment of the restraining force to prevent linear movement can be effected by the torque placed on bolt 96. Bolt 92 will prevent second plate 20 from being pulled off rod 30 in cases of severe loading on EOAT 11. Bolt 92 also eliminates angular movement between plate 20 and rod 30.

The clutch 7 provides the necessary rigidity to perform programmed tasks while also providing a breakaway joint in the event that the EOAT 11 strikes an obstruction causing a load to be imposed upon the EOAT 11 beyond a predetermined amount. The clutch 7 is so designed such that it yields during EOAT 11 crashes which occur in any possible direction, thus minimizing costly EOAT 11 and robot 9 damage.

The robot crash is sensed with an inductive type proximity sensor means 60 or detector. The proximity sensor 68 is mounted in a block 66 attached to a generally elongated flat flexible glass-filled nylon beam 62. The sensor 68 is aligned on a steel target 69 in a flexible glass-filled nylon generally elongated flat beam 64 and provides a normally closed signal to the robot controller (not shown) when the robot 9 clutch 7 is in the pre-crash condition (FIG. 1).

In the event of a tooling interference, the rod angulates or rotates at the ball joint pivotal mounting with first plate 10 (FIG. 1) and/or the second plate 20 slides with respect to rod 30. The sensor means 60 is so designed that the steel target 69 is no longer within the sensing range of the proximity sensor 68 and thus alerts the controller that the robot 9 has encountered an obstruction. The robot controller can shut off power to the robot so that severe damage to EOAT 11 and/or robot 9 is prevented.

The sensor means 60 simple two beam assembly is capable,, of sensing a displacement of the second plate 20 from fixed position with respect to the first plate 10 joint irrespective of the way in which the displacement occurs. (Note torsion of second plate 20 will cause the beams 62 and 64 to twist away from one another). Therefore only one sensor is required for the three axes of displacement (rotation of rod 30 causing second plate 20 to rotate with respect to first plate 10, translation of plate 20, pivotal movement of rod 30).

The present invention provides a method for allowing deformation in the position of an EOAT connected to a robot or like with respect to the position of a robot or like connected with the robot due to loading upon the EOAT beyond a predetermined amount, the method including the steps of:

1. Mounting with the robot 9 a first plate 10;
2. Mounting with the EOAT 11 a second plate 20 spaced from the first plate 10;
3. Pivotally connecting with the first 10 or second 20 plate a rod 30 mounted with the other plate;
4. Angularly restraining the position of the rod 30 with respect to the plate the rod is pivotally connected to whereby the second plate 20 has a fixed position with respect to the first plate 10 unless the EOAT 11 is loaded beyond a predetermined amount causing the rod 30 to pivot.

While an embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A clutch adapted to be connected between an EOAT and a robot or like for deformation upon loading upon said EOAT beyond a predetermined amount, said clutch comprising in combination:
   a first plate for connection with said robot or like;
   a second plate spaced from said first plate for connection with said EOAT;
   a rod pivotally mounted with respect to one of said plates and mounted with said other plate; and
   means to angularly restrain said rod with respect to said plate said rod is pivotally mounted to whereby said second plate has a fixed position with respect to said first plate unless said EOAT is loaded beyond a predetermined amount causing said rod to pivot.

2. A clutch as described in claim 1 wherein said rod is pivotally mounted to said first plate.

3. A clutch as described in claim 2 wherein said second plate is mounted for relative movement with respect to said rod and further including means to restrain movement of said second plate with respect to said rod whereby said second plate has a fixed position with respect to said first plate unless said EOAT is loaded beyond a predetermined amount causing said second plate to move with respect to said rod.

4. A clutch as described in claim 2 wherein said rod is mounted for relative rotational movement with respect to said first plate and further including means to restrain rotational movement of said second plate with respect to said first plate whereby said second plate has a fixed angular rotational position with respect to said first plate unless said EOAT is loaded beyond a predetermined amount causing said rod to rotate with respect to said first plate.

5. A clutch as described in claim 1 wherein said means to angularly restrain said rod is adjustable.

6. A clutch as described in claim 1 further including means to detect a deviation in the position of said second plate with respect to said first plate.

7. A clutch as described in claim 3 wherein said means to restrain movement of said second plate with respect to said rod is adjustable.

8. A clutch as described in claim 6 wherein said detection means includes a first beam connected with said first plate and a second beam connected with said second plate with sensor means detecting relative motion between said first and second beams.

9. A clutch as described in claim 1 further including means to allow said second plate to rotate and to translate with respect to said first plate and said clutch including a single sensor detection means to determine any change in the position of said second plate with respect to said first plate.

10. A clutch adapted to be connected between an EOAT and a robot or like for deformation upon loading of said EOAT beyond a predetermined amount, said clutch comprising in combination:

a first plate for connection with said robot or like;

a second plate spaced from said first plate for connection with said EOAT;

means to detect a change of position of said second plate with respect to said first plate;

a rod pivotally and rotatively mounted with respect to said first plate and relatively mounted with respect to said second plate in a linear fashion;

adjustable means to angularly and rotatively restrain said rod with respect to said first plate; and adjustable means to restrain linear movement of said second plate with respect to said rod whereby said second plate has a fixed position with respect to said first plate unless said EOAT is loaded beyond a predetermined amount causing said rod to pivot or rotate or said second plate to linearly move with respect to said rod.

11. A method for allowing deformation in the position of an EOAT connected to a robot or like with respect to the position of said robot or like due to loading upon said EOAT beyond a predetermined amount, said method in combination comprising:

mounting with said robot or like a first plate;

mounting with said EOAT a second plate spaced from said first plate;

pivotally connecting with said first or second plate a rod mounted with said other plate;

angularly restraining the position of said rod with respect to said plate said rod is pivotally connected to whereby said second plate has a fixed position with respect to said first plate unless said EOAT is loaded beyond a predetermined amount causing said rod to pivot.

* * * * *